United States Patent
Oh et al.

(10) Patent No.: US 8,512,904 B2
(45) Date of Patent: Aug. 20, 2013

(54) FUEL CELL SYSTEM FOR PROMPTLY INCREASING TEMPERATURE OF FUEL CELL STACK DURING START UP OPERATION OF THE FUEL CELL SYSTEM AND METHOD OF MANAGING THE FUEL CELL SYSTEM

(75) Inventors: Duk-jin Oh, Yongin-si (KR); Hyun-chul Lee, Yongin-si (KR); Tae-won Song, Yongin-si (KR); Dong-kwan Kim, Yongin-si (JP); Yong Wang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1495 days.

(21) Appl. No.: 11/841,219

(22) Filed: Aug. 20, 2007

(65) Prior Publication Data

US 2008/0176114 A1    Jul. 24, 2008

(30) Foreign Application Priority Data

Jan. 23, 2007    (KR) .................................. 2007-7238

(51) Int. Cl.
*H01M 8/04*    (2006.01)
*H01M 8/06*    (2006.01)

(52) U.S. Cl.
USPC ........... 429/433; 429/408; 429/415; 429/419; 429/434; 429/437

(58) Field of Classification Search
None
See application file for complete search history.

(56) References Cited

U.S. PATENT DOCUMENTS

| 6,312,842 | B1 * | 11/2001 | Reiser et al. | 429/437 |
| 2004/0038113 | A1 * | 2/2004 | Enjoji et al. | 429/38 |
| 2005/0255352 | A1 * | 11/2005 | Matoba | 429/22 |

FOREIGN PATENT DOCUMENTS

| JP | 2000-164223 | 6/2000 |
| JP | 2000-164233 | 6/2000 |
| JP | 2003-257460 | 9/2003 |
| JP | 2006-294335 | 10/2006 |
| KR | 10-2006-0014169 | 2/2006 |

OTHER PUBLICATIONS

U.S. Appl. No. 11/834,197, Aug. 6, 2007, Duk-jin Oh et al., Samsung SDI Co., Ltd.

* cited by examiner

*Primary Examiner* — Barbara Gilliam
*Assistant Examiner* — Kwang Han
(74) *Attorney, Agent, or Firm* — Stein IP, LLC (57) ABSTRACT

A fuel cell system a includes a cooling water temperature raising unit that raises the temperature of a fuel cell stack by passing discharge gas of a process burner or hydrogen gas of a fuel processing unit and cooling water that is heated by the discharge gas of the process burner through flow paths formed on opposing surfaces of cooling separators formed of a metal and installed between a plurality of cells in the stack. Thus in the fuel cell system, when the temperature of the stack needs to be rapidly raised, for example, during a start up operation of the fuel cell system, the temperature of the stack can be rapidly raised using discharge gas at a high temperature or combustion heat of hydrogen gas, and heated cooling water, and thereby, significantly reducing the time required for the fuel cell system to be in regular operation.

20 Claims, 8 Drawing Sheets

FUEL CELL SYSTEM FOR PROMPTLY INCREASING TEMPERATURE OF FUEL CELL STACK DURING START UP OPERATION OF THE FUEL CELL SYSTEM AND METHOD OF MANAGING THE FUEL CELL SYSTEM

CROSS-REFERENCE TO RELATED APPLICATION

This application claims the benefit of Korean Application No. 2007-7238, filed Jan. 23, 2007 in the Korean Intellectual Property Office, the disclosure of which is incorporated herein by reference.

BACKGROUND OF THE INVENTION

1. Field of the Invention

Aspects of the present invention relate to a fuel cell system, and more particularly, to a fuel cell system that promptly increases the temperature of a fuel cell stack during a start up operation of the fuel cell system and a method of managing the fuel cell system.

2. Description of the Related Art

Figure 1:
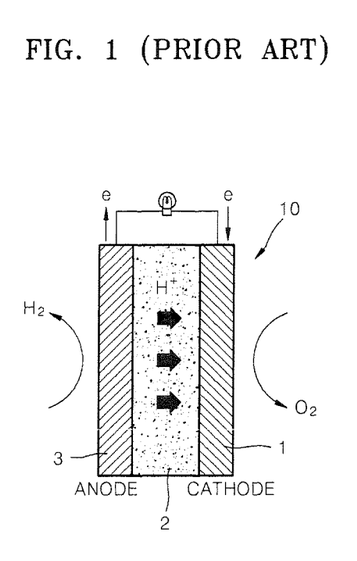
FIG. 1 is a schematic drawing illustrating the energy transformation structure of a conventional fuel cell.
Figure 2:
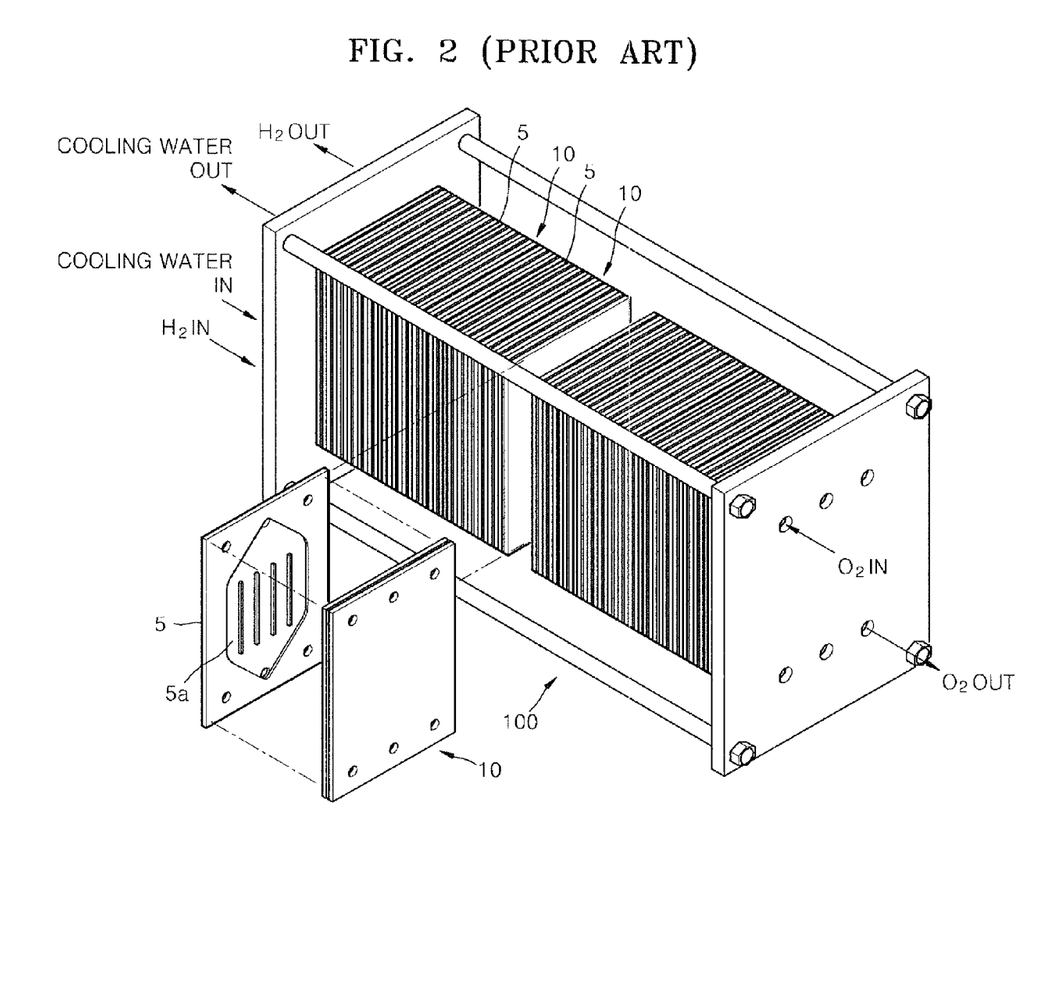
FIG. 2 is a perspective view of a conventional stack structure of a fuel cell.
Figure 3:
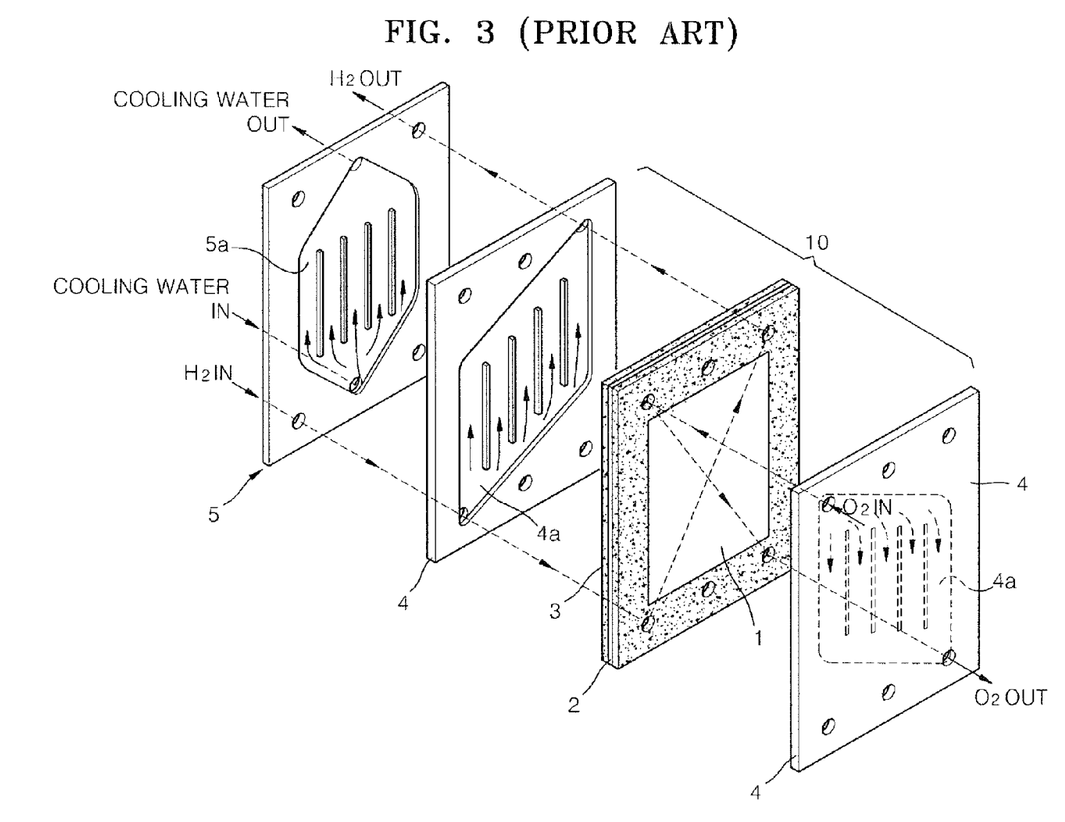
FIG. 3 is an exploded perspective view of a conventional unit cell structure of a fuel cell.

Conventionally, a fuel cell is an apparatus that directly converts chemical energy of a fuel into electric energy through a chemical reaction. In particular, a fuel cell is used as a power generator and generates electricity as long as fuel is supplied to the fuel cell. FIG. 1 illustrates the energy conversion structure of a unit cell 10 of a conventional fuel cell. As illustrated in FIG. 1, when air, containing oxygen, is supplied to a cathode 1, and a fuel that includes hydrogen is supplied to an anode 3, an inverse water-electrolysis reaction is performed through an electrolyte layer 2, thereby generating electricity. However, the electricity generated by a unit fuel cell 10 does not have a high enough voltage for practical use. Therefore, unit fuel cells 10 are typically arranged in series in of the form of a stack 100 (FIG. 2). Each of the fuel cells 10 in the stack 100 includes the electrolyte layer 2, and the cathode 1 and the anode 3 respectively disposed on each side of the electrolyte layer 2. Flow path plates 4 having surface flow paths 4a, for supplying oxygen or hydrogen gas to the cathode 1 and anode 3, are installed adjacent to the unit fuel cells 10. Accordingly, when hydrogen and oxygen are supplied to the stack 100 as illustrated in FIGS. 2 and 3, oxygen or hydrogen respectively passes through the cathode 1 or the anode 3 through the flow paths 4a of each of the unit fuel cells 10 and circulates. Since heat is also generated by the electrochemical reactions of the fuel cell system, the heat needs to be removed in order to operate the fuel cell system within a normal operating temperature range. To this end, a cooling plate 5, which transports cooling water that absorbs heat, is installed in the fuel cell stack at an interval of about one cooling plate 5 for about every five or six unit fuel cells 10. Accordingly, cooling water passes through flow paths 5a of the cooling plate 5 and absorbs the heat generated by the stack 100. The cooling water, which absorbs the heat, is cooled by secondary cooling water in a heat-exchanger H5 (see FIG. 5) and is circulated again in the stack 100.

In previous fuel cell systems, secondary cooling water, after heat-exchanging with the cooling water circulating in the stack 100, was sent directly to the hot water tank 120 in order to be used as hot water for extraneous purposes. In other words, the fuel cell system could also function as a hot water heater. However, the temperature of the secondary cooling water was generally not sufficient for the secondary cooling water to be very useful as hot water. Therefore, recently, a process burner 110 has been installed to use up the remaining hydrogen in a fuel cell system. A process burner 110 operates by using any hydrogen that was not consumed in the stack 100 as a main fuel. Water is heated using the process burner 110 and is stored in a hot water tank 120.

Figure 4:
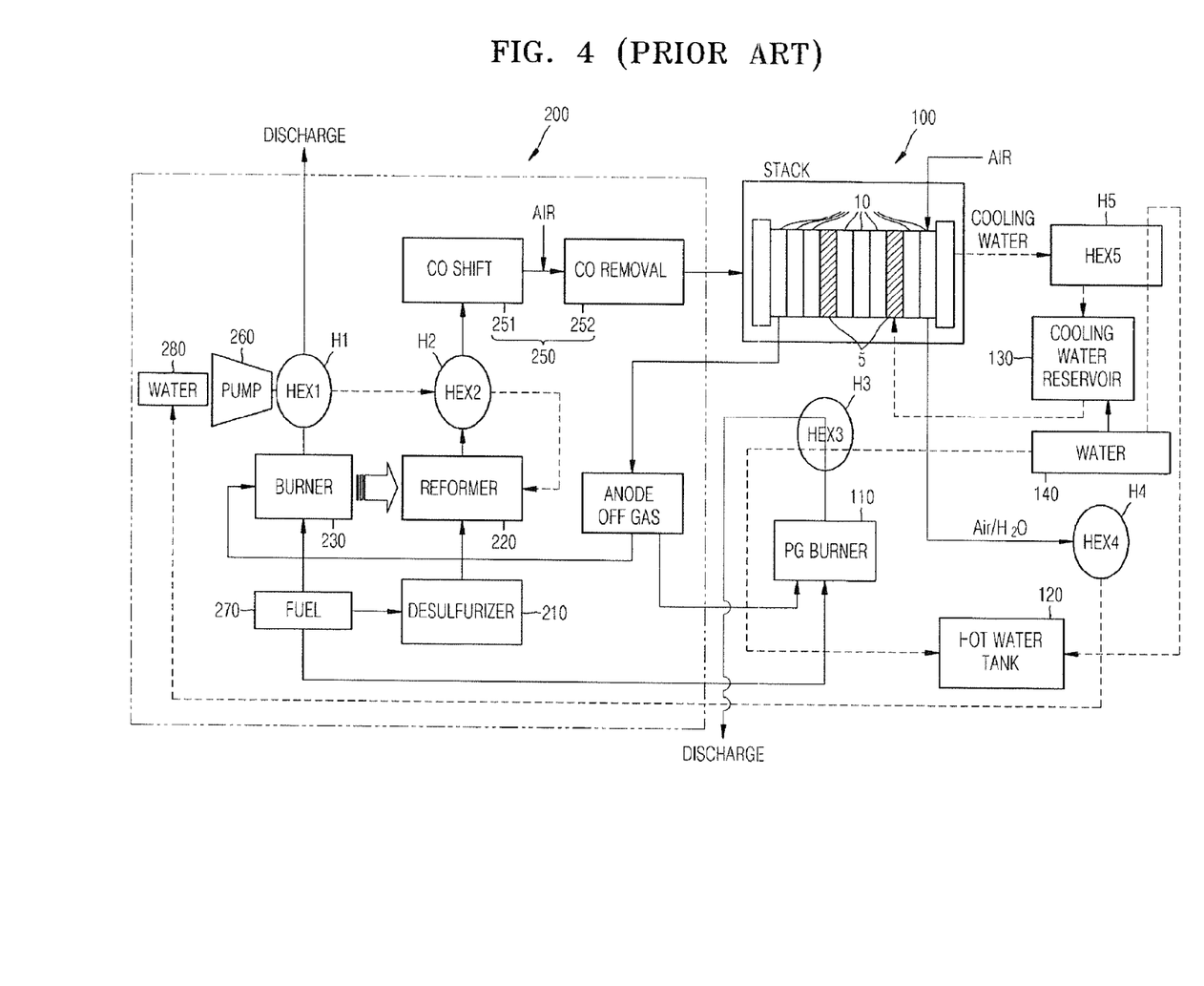
FIG. 4 is a block diagram of a conventional fuel cell system.

The fuel source that supplies hydrogen to the stack 100 may be a hydrocarbon-based material, such as natural gas. As illustrated in FIG. 4, hydrogen is generated from a fuel source in a fuel processing unit 200 and is supplied to the stack 100. The fuel processing unit 200 includes a desulfurizer 210, a reformer 220, a burner 230, a water supply pump 260, first and second heat-exchangers H1 and H2, and a carbon monoxide (CO) removing unit including a CO shifter 251 and a CO remover 252. Hydrocarbon based gas, which flows from a fuel tank 270, and water vapor, which comes from a water tank 280 connected to a water supply pump 260, react in the reformer 220, which is heated by the burner 230, and thereby, generating hydrogen in the reformer 220. Carbon dioxide and CO are generated as by-products. At this point, the generated CO must be removed, because if a fuel mixed with more than 10 ppm of CO, is supplied to the stack 100, the anode 3 becomes poisoned and the performance of the fuel cell 10 rapidly decreases. Accordingly, the CO shifter 251 and the CO remover 252 are disposed at the exit of the reformer 220 to control the amount of CO to be 10 ppm or less. In the CO shifter 251, CO and water vapor react to produce carbon dioxide, and in the CO remover 252, CO is directly oxidized by oxygen. The fuel passing through the CO shifter 251 includes CO with an amount of 5000 ppm or less, and when the fuel exits the CO remover 252, the amount of CO in the fuel is 10 ppm or less. The desulfurizer 210 removes sulfur contaminants from the fuel source before the fuel source enters the reformer 220. Sulfur compounds can poison the anode 3 even in amounts as small as 10 parts per billion (ppb), and also can poison catalysts used in the CO shifter 251 and CO remover 252. Therefore, sulfur compounds are absorbed and removed from the fuel source by passing the fuel source through the desulfurizer 210.

Accordingly, in operating a fuel cell system including the fuel processing unit 200 and the stack 100, hydrogen is generated in the above described manner in the fuel processing unit 200, and electricity is generated in the stack 100 using hydrogen supplied from the fuel processing unit 200 as a fuel. As illustrated in FIGS. 2, 3 and 4, hydrogen passes through a hydrogen flow path to contact the anode 3, and air, which is the oxygen source, passes through an oxygen flow path to contact the cathode 1.

The temperature inside the stack 100 should be maintained at a constant temperature in order to properly operate the fuel cell system so that electricity can be constantly generated in the stack 100. For example, a stack may have a normal operating temperature of about 120° C. However, if a stack has been idle and has cooled to room temperature, it takes a long time to get back up to the normal operating temperature inside the stack 100. During a start up operation of the fuel cell system, in order to increase the temperature of the stack 100, the cooling water reservoir 130 is heated using an electric heater, and the heated cooling water is circulated to the stack 100, thereby increasing the temperature of the stack 100. The temperature of the stack 100 is also increased by heat radiation while electricity is generated in the stack. However, at the start of the operation of the fuel cell system, such as when the stack is at or near the room temperature, it may take almost an hour until the temperature of the stack 100 reaches a temperature at which the fuel cell system is running properly, such as, for example, 120° C. Typically, the start up of the fuel processing unit 200 is much faster, and the fuel processing unit is able to supply hydrogen much sooner than the stack 100 is able to use the hydrogen efficiently, since, the fuel cell system cannot operate efficiently until the temperature of the stack 100 reaches the predetermined temperature. Thus, a large delay occurs while waiting for the temperature of the stack 100 to reach the predetermined temperature.

Therefore, to easily operate the fuel cell system, a method of increasing the temperature of the stack 100 more rapidly during a start up operation of the fuel cell system is desirable.

SUMMARY OF THE INVENTION

Aspects of the present invention provide a fuel cell system that promptly increases the temperature of a fuel cell stack during a start up operation of the fuel cell system and a method of managing the fuel cell system.

According to an embodiment of the present invention, there is provided a fuel cell system comprising: a stack formed of a plurality of cells in which electricity is generated using hydrogen; a fuel processing unit that processes a hydrocarbon from a fuel source to generate hydrogen to be supplied to the stack; a process burner that operates with hydrogen that is not consumed by the stack or with hydrocarbon from the fuel source and that generates a process burner discharge gas; a plurality of cooling separators installed between the cells in the stack, wherein each cooling separator comprises a metal thin plate having a first flow path and a second flow path formed in a complementary pattern on first and second opposing surfaces, respectively, of the metal thin plate; a cooling water circulating unit including a main cooling water line that circulates cooling water to the second flow path of the cooling separators to reduce the temperature of the stack; a discharge gas temperature raising unit that raises the temperature of the stack by passing the process burner discharge gas through the first flow path on the first surface of the cooling separators; and a cooling water temperature raising unit that raises the temperature of the stack by heating cooling water of the cooling water circulating unit by heat exchange with the process burner discharge gas and passing the heated cooling water through the second flow path on the second surface of the cooling separators.

According to another embodiment of the present invention, there is provided a fuel cell system comprising: a stack formed of a plurality of cells in which electricity is generated using hydrogen; a fuel processing unit that processes a hydrocarbon from a fuel source to generate hydrogen to be supplied to the stack; a process burner that operates with hydrogen that is not consumed by the stack or with a hydrocarbon from the fuel source and that generates a process burner discharge gas; a plurality of cooling separators installed between the cells in the stack, wherein each cooling separator comprises a metal thin plate having a first flow path and a second flow path formed in a complementary pattern on first and second opposing surfaces, respectively, and wherein the first surface of the metal thin plate includes a catalyst coated thereon that catalyzes combustion of hydrogen; a cooling water circulating unit including a main cooling water line that circulates cooling water to the second flow path of the cooling separators to reduce the temperature of the stack; a combustion heat temperature raising unit that raises the temperature of the stack by passing hydrogen supplied from the fuel processing unit through the first flow paths on a first surface of the cooling separators, wherein the hydrogen contacts the catalyst; and a cooling water temperature raising unit that raises the temperature of the stack by heating the cooling water by heat exchange with the process burner discharge gas and passing the heated cooling water through the second flow path on a second surface of the cooling separators.

According to an aspect of the present invention, the discharge gas temperature raising unit may comprise a discharge gas connection line connecting a discharge gas flow path of the process burner to the first flow path on the first surface of the cooling separators and a valve installed on the discharge gas connection line to selectively direct the process burner discharge gas to pass through the first flow path on the first surface of the cooling separators or to be directly discharged.

According to an aspect of the present invention, the cooling water temperature raising unit may comprise a cooling water connection line that diverges from the main cooling water line, passes through a heat-exchanger, wherein the cooling water is heated with heat from the process burner discharge gas, and reconnects to the main cooling water line to direct the heated cooling water through the second flow path of the cooling separators, and a valve installed on a diverging portion of the cooling water circulating unit to selectively direct the cooling water directly to the second flow path of the cooling separators or to the cooling water connection line.

According to an aspect of the present invention, the combustion heat temperature raising unit may comprise a hydrogen gas connection line connecting a flow path of hydrogen gas supplied from the fuel processing unit to the first flow paths on the first surface of the cooling separators, and a valve installed on the hydrogen gas connection line to selectively direct hydrogen gas from the fuel processing unit to pass to the cells of the stack or to the first flow path of the first surface of the cooling separators of the stack.

According to another embodiment of the present invention, there is provided a method of managing a fuel cell system, the method comprising: providing a stack in which cooling separators are formed between cells in the stack, wherein each cooling separator is formed of a metal thin plate having a first flow path and a second flow path formed in a complementary pattern on first and second opposing surfaces, respectively, of the metal thin plate; rapidly raising the temperature of the stack during a start up operation of the fuel cell system by passing discharge gas of a process burner through the first flow path formed on the first surface of the cooling separators and passing heated cooling water, heated by heat exchange with discharge gas of a process burner, through the second flow paths formed on the second surface of the cooling separators; and stopping the passing of the discharge gas through the first flow path formed on the first surface of the cooling separators and the passing of the heated cooling water through the second flow path formed on the second surfaces of the cooling separators when the temperature of the stack reaches a predetermined temperature.

According to another aspect of the present invention, there is provided a method of managing a fuel cell system, the method comprising: providing a stack in which cooling separators are formed between cells in the stack, wherein each cooling separator is formed of a metal thin plate having a first flow path and a second flow path formed in a complementary pattern on first and second opposing surfaces, respectively, of the metal thin plate and wherein the first surface of the metal thin plate includes a catalyst coated thereon that catalyzes combustion of hydrogen; rapidly raising the temperature of the stack during a start up operation of the fuel cell system by passing hydrogen through the first flow path on the first surface of the cooling separators, whereby the hydrogen combusts to generate heat and by passing heated cooling water, heated by heat exchange with discharge gas of a process burner, through the second flow path formed on a second surface of the cooling separators; and stopping the passing of the hydrogen through the first flow path on the first surface of the cooling separators and the passing of the heated cooling water through the second flow path formed on a second surface of the cooling separators when the temperature of the stack reaches a predetermined temperature.

According to another aspect of the present invention, there is provided a fuel cell system comprising a stack formed of a plurality of cells in which electricity is generated using hydrogen; and a plurality of cooling separators installed between the cells in the stack, wherein each cooling separator comprises a metal thin plate having a first flow path and a second flow path formed in a complementary pattern on first and second surfaces, respectively, of the metal thin plate.

According to another aspect of the present invention, there is provided a method of increasing an internal temperature of a fuel cell stack during a start up operation of a fuel cell system, comprising providing a stack formed of a plurality of cells in which electricity is generated using hydrogen and a plurality of cooling separators installed between the cells in the stack, wherein each cooling separator comprises a metal thin plate having a first flow path and a second flow path formed in a complementary pattern on first and second surfaces, respectively, of the metal thin plate and simultaneously passing a heated gas through the first flow path and passing heated water through the second flow path until the internal temperature of the fuel cell stack reaches a predetermined normal operating temperature.

According to another aspect of the present invention, there is provided a method of increasing an internal temperature of a fuel cell stack during a start up operation of a fuel cell system, comprising providing a stack formed of a plurality of cells in which electricity is generated using hydrogen and a plurality of cooling separators installed between the cells in the stack, wherein each cooling separator comprises a metal thin plate having a first flow path and a second flow path formed in a complementary pattern on first and second surfaces, respectively, of the metal thin plate and wherein the first surface of the metal thin plate of each cooling separator includes a catalyst that catalyzes combustion of hydrogen, and simultaneously passing hydrogen through the first flow path, whereby the hydrogen combusts and passing heated water through the second flow path until the internal temperature of the fuel cell stack reaches a predetermined normal operating temperature.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
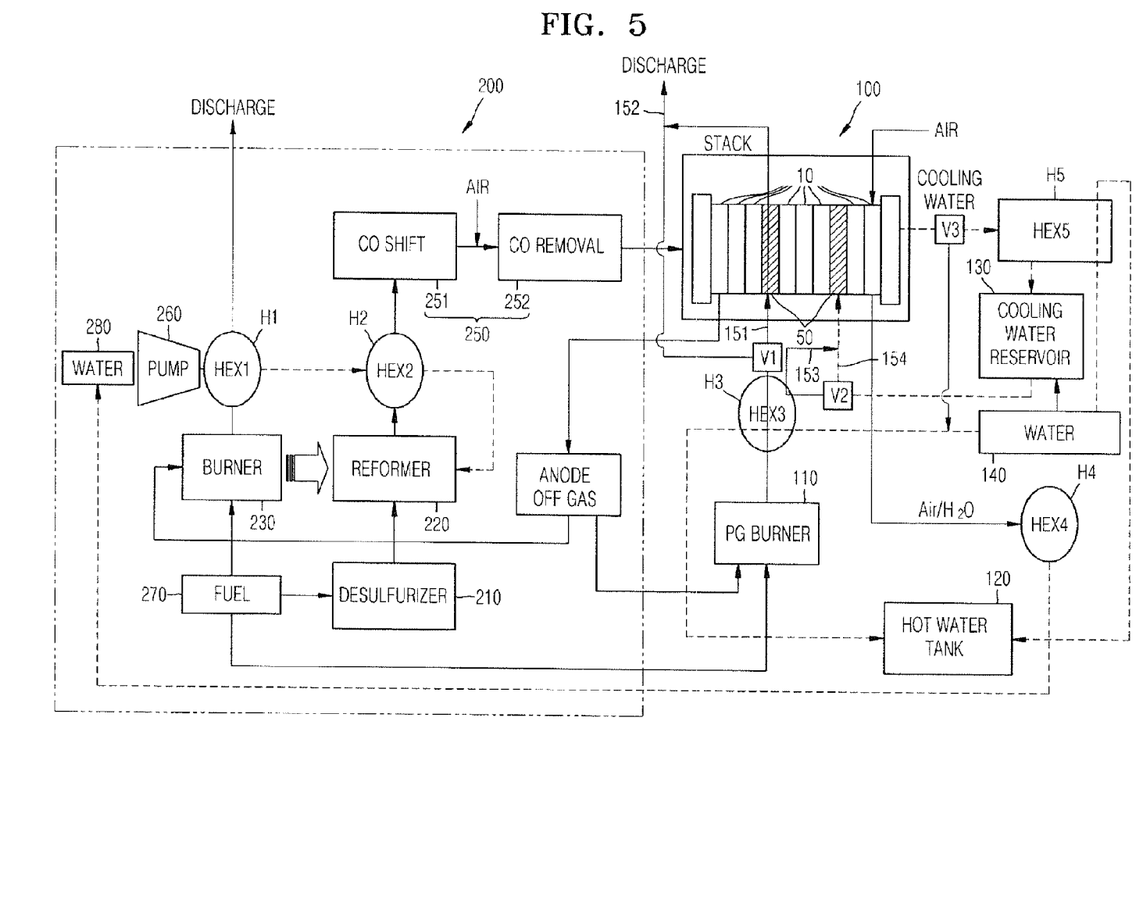
FIG. 5 is a block diagram of a fuel cell system according to an embodiment of the present invention.

FIG. 5 is a block diagram of a fuel cell system according to an embodiment of the present invention. In the fuel cell system, hydrogen is generated in a fuel processing unit 200 and is supplied to a stack 100, and in the stack 100, the hydrogen, which is supplied from the fuel processing unit 200, is used to generate electricity in the same manner as the conventional art.

Since the fuel processing unit 200, according the present embodiment, includes elements and connection structures that are similar to those of the fuel processing unit 200 illustrated in FIG. 4, a description thereof will be omitted.

Figure 6:
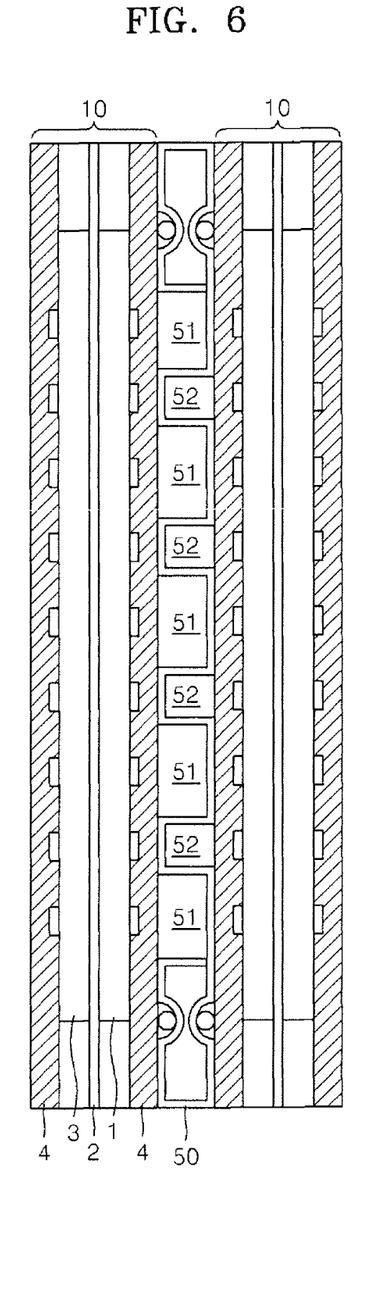
FIG. 6 is a cross-sectional view of a cooling separator installed between unit cells of the stack of the fuel cell system of FIG. 5.

In addition, the unit cells 10 included in the stack 100 are similar to the conventional fuel cell system, and thus, a description thereof will be omitted. However, the cooling plate 5 (see FIG. 2) is replaced with cooling separators 50 that are formed by pressing a metal thin plate such that flow paths 51 and 52 in a complementary intaglio and relief pattern are formed on both sides of the metal thin plate. In detail, the conventional cooling plate 5 includes flow paths 5a through which cooling water flows and which are formed by engraving grooves in a plate formed of graphite. In the present embodiment, on the other hand, each cooling separator 50 is formed of a metal thin plate and is pressed or formed to provide flow channels on both sides of the metal thin plate in a complementary pattern, such as an intaglio and relief pattern. In other words, the flow path 51 on one side of the cooling separator 50 comprises a plurality of channels that, on the reverse side of the cooling separator 50, form elevated boundaries of the flow path 52. Likewise, the flow path 52 on the reverse side of the cooling separator 50 comprises channels that, on the first side of the cooling separator 50, form the elevated boundaries of the flow path 51. A metal thin plate is used because a metal thin plate has a smaller thermal mass than a graphite plate, and thus, heat transfer of the metal thin plate is faster than in the graphite plate, which is appropriate for rapid heating and rapid cooling. In addition, the flow paths 51 and 52 of the cooling separators 50 can be easily formed through a one-time pressing. The cooling separators 50 cool the stack 100 using cooling water passing through the flow path 52, in a similar manner as conventional cooling plates during their regular operation. During a start up operation of the fuel cell system, the cooling separators 50 facilitate raising the temperature of the stack 100 rapidly by passing heated fluid through the flow paths 51 and 52, as described in more detail herein. Since the function of the cooling separators 50 during the normal operation of the fuel cell is to cool the stack 100, the term "cooling separators" is used herein when describing these structures, even when describing the participation of the cooling separators 50 in heating the stack during a start up operation as described herein. The cooling separators in a stack 100 are fluidly connected such that a heated fluid in the flow path 51 passes through all of the cooling separators 50 of the stack 100 and cooling water or heated cooling water in the flow path 52 passes through all of the cooling separators 50 of the stack 100. As used herein, the term "flow path 51" refers to both the channels of an individual separator 50 and the entire path taken by a heated fluid through all of the separators 50 of the stack 100. Likewise, the term "flow path 52" refers to both the channels of an individual separator 50 and the entire path taken by a cooling water or heated cooling water through all of the separators 50 of the stack 100. The method of managing the fuel cell system will be described more in detail later.

A cooling water circulation unit is disposed around the stack 100 to counteract the heat generated during the generation of electricity. In the cooling water circulation unit, cooling water, which is stored in a cooling water reservoir 130, is supplied to the cooling separators 50 in the stack 100 so as to absorb the heat of the stack 100. After the cooling water has absorbed heat from the stack 100 and has exited the stack 100, the cooling water undergoes a heat exchange with secondary cooling water, thereby dissipating the heat absorbed from the stack 100, and returns to the cooling water reservoir 130.

A process burner 110 (labeled 'PG Burner' in FIGS. 4 and 5) burns hydrogen that passes through the stack 100 unconsumed during regular operation of the fuel cell system. During a start up operation of the fuel cell system, when it is too soon for hydrogen generated in the fuel processing unit 200 to be injected into the anode 3, because the normal operating temperature of the stack 100 has not been reached, the fuel is directly injected into the process burner 110 to operate the process burner 110 and thus, heat the water that exits from a water tank 140 using a heat-exchanger H3. The heated water of the water tank 140 is sent to a hot water tank 120 in order to be used for extraneous purposes.

In order to rapidly raise the temperature of the stack 100, flow paths 51 and 52 of the cooling separators 50 include a discharge temperature raising unit, which directly passes a discharge gas of the process burner 110 to the stack 100, and a cooling water temperature raising unit, which heats the cooling water of the cooling water reservoir 130 using the process burner 110, and then, passes the heated cooling water to the stack 100. As used herein, the term "cooling water" refers generally to any water that originates in the cooling water reservoir 130 and that is passed through the stack 100, whether the water is at a cool or ambient temperature or is heated. Without a modifier, the term "cooling water" as used herein refers generally to water that has not been heated, such as, for example, cooling water that is directed to the stack to cool the stack 100 during the normal operations of the fuel cell system. The terms "heated cooling water" or "high temperature cooling water" or similar terms refer to cooling water that has been heated, such as, for example, by heat exchange with the process burner discharge gas, before being directed to the stack 100 during a start up operation of the fuel cell system.

In the conventional art, the process burner discharge gas is discharged after passing through the heat-exchanger H3 to heat water that is sent to the hot water tank 120. But according to the current embodiment of the present invention, the discharge gas can be selectively passed to the cooling separators 50 by manipulating a valve. That is, a first valve V1 provides a selection of whether to discharge the process burner discharge gas through a discharge line 152 or to send the discharge gas of the process burner 110 through a discharge gas connection line 151 into the stack 100. Accordingly, if the first valve V1 is set to a discharge gas injection mode, the process burner discharge gas passes through the flow path 51 of the cooling separators 50 installed in the stack 100 through the discharge gas connection line 151 and is discharged to the outside.

In addition, in order to heat and supply the cooling water of the cooling water reservoir 130 to the stack 100, a cooling water connection line 153, which directs the cooling water of the cooling water reservoir 130 to pass through the heat-exchanger H3, and a second valve V2, installed at a diverging point between the cooling water connection line 153 and a main stream 154 directed to the flow path 52 of the cooling separators 50, are included in the fuel cell system. In other words, the cooling water of the cooling water reservoir 130 flows directly to the flow path 52 of the cooling separators 50 during the regular operation of the fuel cell. However, by manipulating the second valve V2, the cooling water of the cooling water reservoir 130 can be directed to pass through the heat-exchanger H3 and enter the cooling separators 50 in a heated state at a high temperature. Thus, the heated cooling water, which is heated to a high temperature, passes through the stack 100 along the flow paths 51 and 52 of the cooling separators 50, and the heated cooling water exiting the stack 100 may flow into the hot water tank 120 or return to the cooling water reservoir 130 according to a selection of a third valve V3. Accordingly, the cooling water of the cooling water reservoir 130 is heated to a high temperature when necessary and is supplied to the stack 100.

The fuel cell system as described above can be controlled in the following manner. First, when the temperature of the stack 100 needs to be rapidly raised as the fuel cell system starts to operate, the first through third valves V1 through V3 are changed into a rapid heating mode. That is, the first through third valves V1 through V3 are manipulated such that the discharge gas of the process burner 110 and the cooling water heated to a high temperature enter the stack 100. In the stack 100, the discharge gas of the process burner 110 passes through the flow path 51 of the cooling separators 50, and the cooling water heated in the heat-exchanger H3 passes through the flow path 52 of the cooling separators 50, thereby heating the stack 100. Accordingly, the discharge gas and the heated cooling water heat the stack 100 at the same time, thereby increasing the temperature raising speed of the stack 100 considerably as compared to the conventional art. In detail, in the conventional art, the cooling water reservoir 130 is heated using an electric heater to supply heated cooling water to the stack 100 so as to raise the temperature of the stack 100. However, according to the present invention, the stack 100 is heated by using discharge gas at a high temperature and heated cooling water, which enables the temperature of the stack to be raised at least two times faster than the conventional art. In detail, in an experiment, it was found to take almost an hour in the conventional art for the temperature of the stack 100 to reach a normal operating temperature of 120° C.; however, when discharge gas at a high temperature and cooling water were used at the same time, it took 30 minutes for the temperature of the stack to reach 120° C. Thus, the method according to the aspects of the present invention only requires half as much time as the method of the conventional art to reach the normal operating temperature of a fuel cell system.

When the stack 100 reaches the predetermined temperature by the above-described initial heating process, the fuel cell system can be changed into a regular operation mode. That is, the first through third valves V1 through V3 may be manipulated in order for the fuel cell system to be in regular operation such that the high temperature discharge gas is discharged and the cooling water does not pass through the heat-exchanger H3 but rather, is injected into the stack 100 at an ambient temperature. When the stack 100 has been heated to the predetermined temperature, electricity can be generated in the stack 100. Thus, a fuel cell system, in which the temperature of a stack 100 can be rapidly raised using discharge gas at a high temperature and heated cooling water, is realized.

Figure 7:
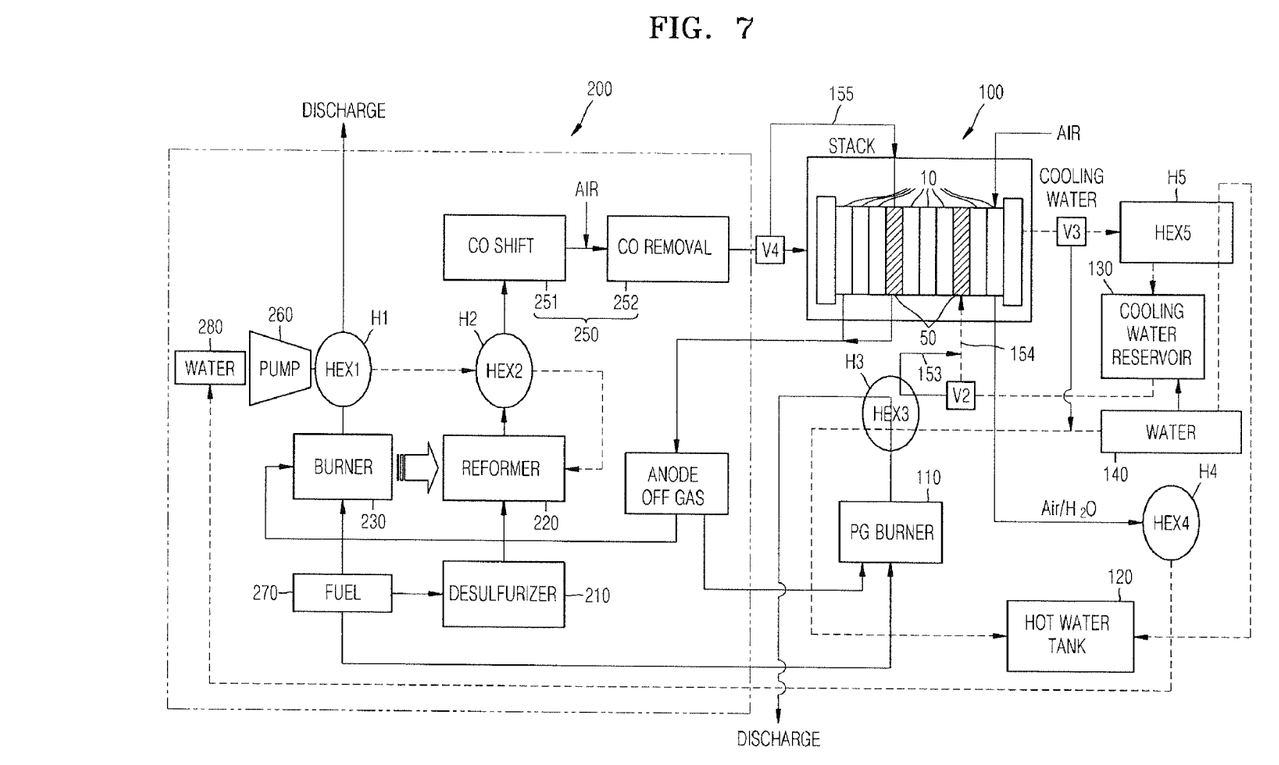
FIG. 7 is a block diagram of a fuel cell system according to another embodiment of the present invention.

FIG. 7 illustrates a fuel cell system according to another embodiment of the present invention. In the present embodiment, a temperature raising mechanism is employed that includes a cooling water temperature raising unit, which uses heated cooling water to raise the temperature of a stack, and a combustion heat temperature raising unit, which uses combustion heat of hydrogen supplied from the processing unit 200, combined together.

A description of the cooling water temperature raising unit will not be repeated because the cooling water temperature raising unit, which supplies cooling water to the flow path 52 of the cooling separators 50 by heating the cooling water using discharge gas of the process burner 110, is identical to that of the previous embodiment.

Figure 8:
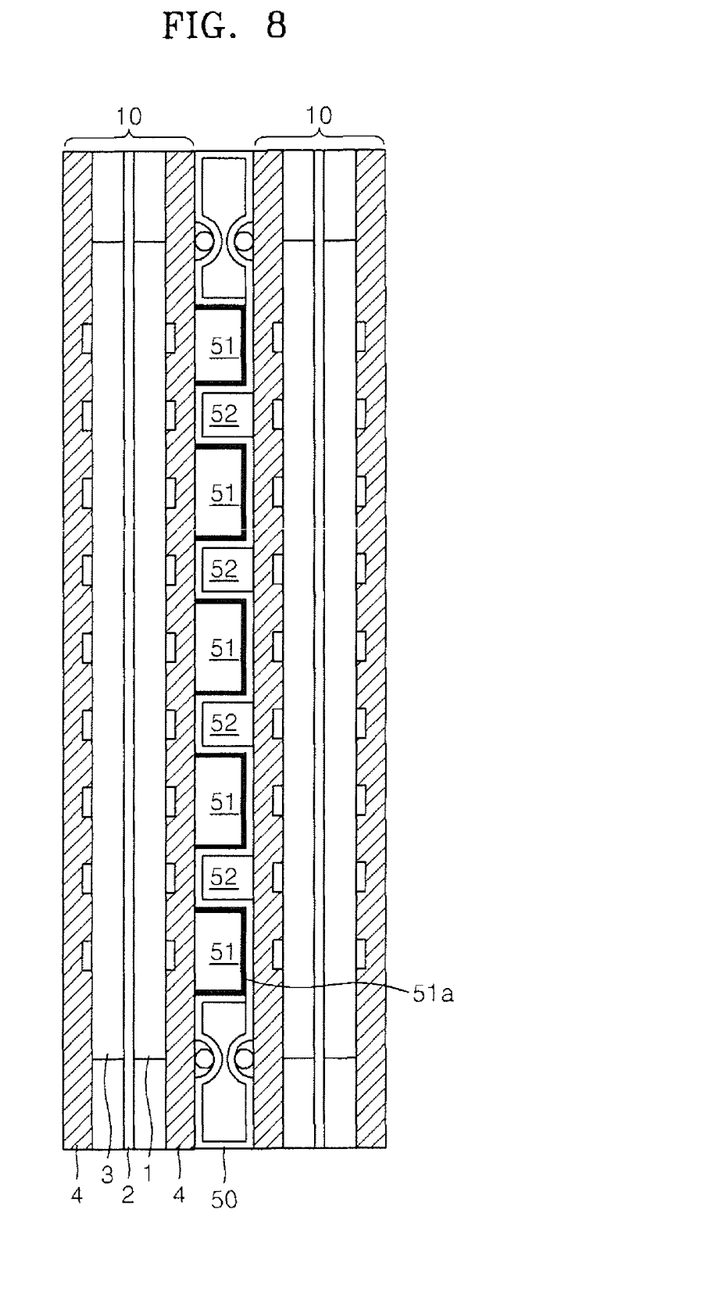
FIG. 8 is a cross-sectional view of a cooling separator installed between unit cells of the stack of the fuel cell system of FIG. 7.

The fuel processing unit 200 includes a hydrogen gas connection line 155 connecting a flow path of hydrogen gas that is supplied from the fuel processing unit 200 to the flow path 51 of the cooling separators 50, as the combustion heat temperature raising unit, and a fourth valve V4 installed to select a flow path in a connection portion between the hydrogen gas connection line 155 and the fuel processing unit 200. Thus, when the fourth valve V4 is set to a rapid heating mode, hydrogen gas, which is supplied from the fuel processing unit 200, is not supplied to the anode 3 in the stack 100, but rather, passes through the hydrogen gas connection line 155 and the flow path 51 of the cooling separators 50. A catalyst 51 a formed of a Pt or Pd based material is coated on a wall of the flow path 51 of the cooling separators 50, as illustrated in FIG. 8, in order to facilitate combustion of hydrogen. Accordingly, as hydrogen gas flows along the flow path 51 of the cooling separators 50, a combustion reaction occurs and the combustion heat rapidly raises the temperature of the stack 100.

The fuel cell system according to the present embodiment can be managed in the following manner.

First, if the temperature of the stack 100 needs to be rapidly raised, such as, for example, during a start up operation of the fuel cell system, the second through fourth valves V2 through V4 are changed into a rapid heating mode. That is, the second through fourth valves V2 through V4 are manipulated such that hydrogen gas from the fuel processing unit 200 and heated cooling water enter the stack 100. Then, the hydrogen gas passes through the flow path 51 of the cooling separators 50 such that a combustion reaction occurs, thereby, generating heat. The heated cooling water, which is heated in the heat-exchanger H3, passes through the flow path 52 of the cooling separators 50, thereby, heating the stack 100. Thus, the combustion heat, which is at a high temperature, and the heated cooling water heat the stack 100 at the same time. Thus, the temperature of the stack 100 rises two or more times faster in the present embodiment than in the conventional art, in which the temperature of the stack 100 is raised by heating the cooling water reservoir 130 using an electric heater.

As the stack 100 reaches the predetermined temperature by the above initial heating process, the fuel cell system changes into a regular operation mode. That is, the second through fourth valves V2 through V4 are manipulated in order for the fuel cell system to be in regular operation such that the hydrogen gas is supplied into the anode 3 in the stack 100 and the cooling water does not pass through the heat-exchanger H3, but rather, the cooling water is injected into the stack 100 at a cool or ambient temperature. During the normal operation of the stack 100 and at a normal operating temperature, electricity is regularly generated in the stack 100. Accordingly, the temperature of the stack 100 can be rapidly raised using the combustion heat of hydrogen gas and the heated cooling water. Besides, in order to supply the hydrogen gas from the fuel processing unit 200 to the anode 3 in the stack 100 after the fuel cell system starts to operate, a condition must be met whereby the concentration of CO is sufficiently low before the hydrogen gas is supplied. This is because, as described above, the anode 3 may be poisoned by carbon monoxide and thus, the performance of the fuel cell system may decrease. Therefore, at a start up of the fuel cell system, there will be a delay before the processor is able to supply hydrogen gas with a sufficiently low concentration. However, in the present embodiment, hydrogen gas is supplied to the cooling separators 50 during a start up operation of the fuel cell system, and thus, it makes no difference during the start up period whether the concentration of CO is sufficiently low as required for normal operations.

As described above, the fuel cell system has the following advantages.

First, if the temperature of the stack needs to be rapidly raised, such as, for example, during a start up operation of the fuel cell system, the temperature of the stack can be rapidly raised using high temperature discharge gas and heated cooling water or using the combustion heat of hydrogen gas and heated cooling water. Thus, the time required for the fuel cell system to be in regular operation is significantly reduced.

Second, the fuel cell system according to the present invention can be realized by modifying the connection between the cooling separators and the fuel cell system while using the elements of the conventional fuel cell system. Thus, a modification of the conventional fuel cell system is very easy and the cost for the modification is low.

Third, since the cooling separators are formed of a metal thin plate, the thermal mass of the cooling separator is less than that of a cooling plate formed of graphite, thereby enabling a more rapid rise in the temperature of the stack during a start up operation of the fuel cell system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
a stack formed of a plurality of cells in which electricity is generated using hydrogen;
a fuel processing unit that processes a hydrocarbon from a fuel source to generate hydrogen to be supplied to the stack;
a process burner that operates with hydrogen that is not consumed by the stack or with a hydrocarbon from the fuel source and that generates a process burner discharge gas;
a plurality of cooling separators installed between the cells in the stack, wherein each cooling separator comprises a metal thin plate having a first flow path and a second flow path formed in a complementary pattern on first and second opposing surfaces, respectively, of the metal thin plate;

a cooling water circulating unit including a main cooling water line that circulates cooling water to the second flow path of the cooling separators to reduce the temperature of the stack;

a discharge gas temperature raising unit that raises the temperature of the stack by passing the process burner discharge gas through the first flow path on the first surface of the cooling separators; and a cooling water temperature raising unit that raises the temperature of the stack by heating cooling water of the cooling water circulating unit by heat exchange with the process burner discharge gas and passing the heated cooling water through the second flow path on the second surface of the cooling separators wherein each cell comprises an anode, a cathode, an electrolyte layer between the anode and the cathode, a hydrogen flow path plate on the anode for supplying hydrogen to the anode, and a oxygen flow path plate on the cathode for supplying oxygen to the cathode, and the cooling separator is placed between the first hydrogen flow path plate and the oxygen flow path plate.

2. The fuel cell system of claim 1, wherein the discharge gas temperature raising unit comprises a discharge gas connection line connecting a discharge gas flow path of the process burner to the first flow path on the first surface of the cooling separators and a valve installed on the discharge gas connection line to selectively direct the process burner discharge gas to pass through the first flow path on the first surface of the cooling separators or to pass to a discharge line.

3. The fuel cell system of claim 1, wherein the cooling water temperature raising unit comprises a cooling water connection line that diverges from the main cooling water line of the cooling water circulating unit, passes through a heat-exchanger, wherein the cooling water is heated with heat from the process burner discharge gas, and reconnects to the main cooling water line to direct the heated cooling water through the second flow path of the cooling separators, and a valve installed on a diverging portion of the cooling water circulating unit to selectively direct the cooling water directly to the second flow path of the cooling separators or to the cooling water connection line.

4. A method of managing a fuel cell system of claim 1, the method comprising:

rapidly raising the temperature of the stack during a start up operation of the fuel cell system by passing the process burner discharge gas through the first flow path on the first surface of the cooling separators and passing heated cooling water, heated by the heat exchange with the process burner discharge gas, through the second flow path on the second surfaces of the cooling separators; and stopping the passing of the discharge gas through the first flow path formed on the first surface of the cooling separators and the passing of the heated cooling water through the second flow path on the second surfaces of the cooling separators when the internal temperature of the stack reaches a predetermined temperature.

5. The method of claim 4, further including maintaining the predetermined internal temperature of the fuel cell stack by passing cooling water that has not been heated through the second flow path on the second surfaces of the cooling separators when the internal temperature of the fuel cell stack reaches or exceeds the predetermined normal operating temperature.

6. The method of claim 4, wherein the passing of the discharge gas through the first flow path on the first surface of the cooling separators comprises manipulating a first valve to selectively divert the discharge gas from a discharge gas outlet to the first flow path on the first surface of the cooling separators.

7. The method of claim 6, wherein the stopping of the passing of the discharge gas through the first flow path on the first surface of the cooling separators when the internal temperature of the stack reaches a predetermined temperature comprises manipulating the first valve selectively divert the discharge gas from the first flow path on the first surface of the cooling separators to the discharge gas outlet.

8. The method of claim 4, wherein the passing of the heated cooling water through the second flow path on the second surfaces of the cooling separators comprises manipulating a second valve to selectively divert cooling water from the main cooling water line to a cooling water connection line that passes through a heat-exchanger, wherein cooling water is heated with heat from the process burner discharge gas, and reconnects to the main cooling water line to direct the heated cooling water through the second flow path of the cooling separators.

9. The method of claim 8, wherein the stopping of the passing of the heated cooling water through the second flow path on the second surfaces of the cooling separators comprises manipulating the second valve to selectively divert cooling water from the cooling water connection line to the main cooling water line such that cooling water that passes through the second flow path of the cooling separators is not heated by heat exchange with the discharge gas.

10. The method of claim 4, comprising:

simultaneously passing the process burner discharge gas through the first flow path and passing the heated cooling water through the second flow path until the internal temperature of the fuel cell stack reaches the predetermined temperature.

11. A fuel cell system comprising:

a stack formed of a plurality of cells in which electricity is generated using hydrogen;

a fuel processing unit that processes a hydrocarbon from a fuel source to generate hydrogen to be supplied to the stack;

a process burner that operates with hydrogen that is not consumed by the stack or with a hydrocarbon from the fuel source and that generates a process burner discharge gas;

a plurality of cooling separators installed between the cells in the stack, wherein each cooling separator comprises a metal thin plate having a first flow path and a second flow path formed in a complementary pattern on first and second opposing surfaces, respectively, and wherein the first surface of the metal thin plate includes a catalyst coated thereon that catalyzes combustion of hydrogen;

a cooling water circulating unit including a main cooling water line that circulates cooling water to the second flow path of the cooling separators to reduce the temperature of the stack;

a combustion heat temperature raising unit that raises the temperature of the stack by passing hydrogen supplied from the fuel processing unit through the first flow path of the cooling separator, wherein the hydrogen contacts the catalyst; and a cooling water temperature raising unit that raises the temperature of the stack by heating cooling water by heat exchange with the process burner discharge gas and passing the heated cooling water through the flow path on the second surface of the cooling separators, wherein each cell comprises an anode, a cathode, an electrolyte layer between the anode and the cathode, a hydrogen flow path plate on the anode for supplying hydrogen to the anode, and a oxygen flow path plate on the cathode for supplying oxygen to the cathode, and the cooling separator is placed between the first hydrogen flow path plate and the oxygen flow path plate.

12. The fuel cell system of claim 11, wherein the combustion heat temperature raising unit comprises a hydrogen gas connection line connecting a flow path of hydrogen gas supplied from the fuel processing unit to the first flow path on the first surface of the cooling separators, and a valve installed on the hydrogen gas connection line to selectively direct hydrogen gas from the fuel processing unit to pass to the cells of the stack or to the first flow path of the first surface of the cooling separators of the stack.

13. The fuel cell system of claim 11, wherein the cooling water temperature raising unit comprises a cooling water connection line that diverges from the main cooling water line of the cooling water circulating unit, passes through a heat-exchanger wherein cooling water in the cooling water connection line is heated with heat from the process burner discharge gas, and reconnects to the main cooling water line to direct the heated cooling water through the second flow path of the cooling separators, and a valve installed on a diverging portion of the cooling water circulating unit to selectively direct cooling water directly to the second flow path of the cooling separators or to the cooling water connection line.

14. A method of managing a fuel cell system of claim 4, the method comprising:
rapidly raising the temperature of the stack during a start up operation of the fuel cell system by passing hydrogen through the first flow path on the first surface of the cooling separators, whereby the hydrogen combusts to generate heat and by passing heated cooling water, heated by the heat exchange with the process burner discharge gas, through the second flow path on the second surface of the cooling separators; and
stopping the passing of the hydrogen through the first flow path on the first surface of the cooling separators and the passing of the heated cooling water through the second flow path formed on a second surface of the cooling separators when the temperature of the stack reaches a predetermined temperature.

15. The method of claim 14, further including maintaining the predetermined internal temperature of the fuel cell stack by passing cooling water that has not been heated through the second flow path on the second surfaces of the cooling separators when the internal temperature of the fuel cell stack reaches or exceeds the predetermined normal operating temperature.

16. The method of claim 14, wherein the passing of the hydrogen through the first flow path on the first surface of the cooling separators comprises manipulating a first valve to selectively divert the hydrogen from a flow line to the cells of the stack to the first flow path on the first surface of the cooling separators.

17. The method of claim 16, wherein the stopping of the passing of the hydrogen through the first flow path on the first surface of the cooling separators when the internal temperature of the stack reaches a predetermined temperature comprises manipulating the first valve selectively divert hydrogen from the first flow path on the first surface of the cooling separators to the flow line to the cells of the stack.

18. The method of claim 14, wherein the passing of the heated cooling water through the second flow path formed on the second surfaces of the cooling separators comprises manipulating a second valve to selectively divert cooling water from the main cooling water line to a cooling water connection line that passes through a heat-exchanger, wherein cooling water is heated with heat from the process burner discharge gas, and reconnects to the main cooling water line to direct the heated cooling water through the second flow path of the cooling separators.

19. The method of claim 18, wherein the stopping of the passing of the heated cooling water through the second flow path formed on the second surfaces of the cooling separators comprises manipulating the second valve to selectively divert cooling water from the cooling water connection line to the main cooling water line such that cooling water that passes through the second flow path of the cooling separators is not heated by heat exchange with the discharge gas.

20. The method of claim 14, comprising:
simultaneously passing hydrogen through the first flow path, whereby the hydrogen combusts and passing the heated cooling water through the second flow path until the internal temperature of the fuel cell stack reaches the predetermined temperature.

* * * * *

UNITED STATES PATENT AND TRADEMARK OFFICE
CERTIFICATE OF CORRECTION

PATENT NO. : 8,512,904 B2
APPLICATION NO. : 11/841219
DATED : August 20, 2013
INVENTOR(S) : Duk-jin Oh et al.

Page 1 of 1

It is certified that error appears in the above-identified patent and that said Letters Patent is hereby corrected as shown below:

In the Claims

In claim 1 (col. 11, line 20), "the first hydrogen" should read -- the hydrogen --.

In claim 11 (col. 13, line 4), "the first hydrogen" should read -- the hydrogen --.

Signed and Sealed this
Twenty-second Day of October, 2013

Teresa Stanek Rea
*Deputy Director of the United States Patent and Trademark Office*